US011831402B2

(12) United States Patent
Idehara et al.

(10) Patent No.: US 11,831,402 B2
(45) Date of Patent: Nov. 28, 2023

(54) SLAVE EQUIPMENT, COMPUTER READABLE MEDIUM, AND EMBEDDED SYSTEM

(71) Applicant: MITSUBISHI ELECTRIC CORPORATION, Tokyo (JP)

(72) Inventors: Akio Idehara, Tokyo (JP); Hirotaka Motai, Tokyo (JP); Yurika Terada, Tokyo (JP); Bampei Kaji, Tokyo (JP); Toshiyuki Otani, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 117 days.

(21) Appl. No.: 17/382,711

(22) Filed: Jul. 22, 2021

(65) Prior Publication Data

US 2021/0351856 A1 Nov. 11, 2021

Related U.S. Application Data

(63) Continuation of application No. PCT/JP2019/009695, filed on Mar. 11, 2019.

(51) Int. Cl.
*H04J 3/06* (2006.01)
*G04G 7/00* (2006.01)

(52) U.S. Cl.
CPC .............. *H04J 3/0638* (2013.01); *G04G 7/00* (2013.01)

(58) Field of Classification Search
CPC .................................. H04J 3/0638; G04G 7/00
See application file for complete search history.

(56) References Cited

U.S. PATENT DOCUMENTS

| 10,333,525 | B1 * | 6/2019 | Gandolfi | ................... H03L 1/02 |
| 10,483,987 | B1 * | 11/2019 | Ranganathan | ........ H03L 7/1972 |
| 11,197,075 | B1 * | 12/2021 | Kamen | ............... H04L 43/0817 |
| 2004/0141526 | A1 * | 7/2004 | Balasubramanian | . H04J 3/0667 370/503 |

(Continued)

FOREIGN PATENT DOCUMENTS

| JP | 2004-258045 A | 9/2004 |
| JP | 2004-340749 A | 12/2004 |

(Continued)

OTHER PUBLICATIONS

International Search Report, issued in PCT/JP2019/009695, PCT/ISA/210, dated Jun. 4, 2019.

*Primary Examiner* — Bailor C Hsu
(74) *Attorney, Agent, or Firm* — Birch, Stewart, Kolasch & Birch, LLP

(57) ABSTRACT

A slave node (300) is slave equipment that operates in accordance with a control frame transmitted from a master node (200). The slave node calculates a control frame statistic that is a statistic of one or more control frames transmitted from the master equipment and estimates a master environment value based on the calculated control frame statistic. The slave node measures a slave environment value. The slave node estimates a frequency deviation of a master clock based on the estimated master environment value and estimates a frequency deviation of a slave clock based on the measured slave environment value. The slave node modifies a clock value of the slave clock based on a difference between the frequency deviation of the master clock and the frequency deviation of the slave clock.

7 Claims, 16 Drawing Sheets

(56) References Cited

U.S. PATENT DOCUMENTS

| | | | |
|---|---|---|---|
| 2005/0002279 A1 | 1/2005 | Kondo | |
| 2010/0202436 A1* | 8/2010 | Albert | H04J 3/0655 |
| | | | 370/350 |
| 2012/0254677 A1* | 10/2012 | Hann | H04L 7/033 |
| | | | 714/707 |
| 2013/0077509 A1* | 3/2013 | Hirota | H04L 43/106 |
| | | | 370/252 |
| 2013/0121351 A1* | 5/2013 | Miyabe | H04L 43/106 |
| | | | 370/503 |
| 2014/0281656 A1* | 9/2014 | Ruesch | G06F 1/12 |
| | | | 713/501 |
| 2014/0348181 A1* | 11/2014 | Chandra | H04J 3/0667 |
| | | | 370/503 |
| 2014/0355629 A1* | 12/2014 | Ito | H04L 69/28 |
| | | | 370/509 |
| 2017/0359137 A1* | 12/2017 | Butterworth | H04J 3/0664 |
| 2017/0359139 A1* | 12/2017 | Butterworth | H04L 69/08 |
| 2018/0059712 A1* | 3/2018 | Kazehaya | G06F 1/12 |

FOREIGN PATENT DOCUMENTS

| | | |
|---|---|---|
| JP | 2010-220194 A | 9/2010 |
| JP | 2010-271172 A | 12/2010 |
| JP | 2011-23788 A | 2/2011 |
| JP | 2011-29756 A | 2/2011 |
| JP | 2014-197065 A | 10/2014 |
| JP | 2016-9365 A | 1/2016 |
| JP | 2017-20852 A | 1/2017 |

\* cited by examiner

Fig. 7

101:MASTER FREQUENCY DEVIATION TABLE

| TEMPERATURE | FREQUENCY DEVIATION |
|---|---|
| −10 | +10 |
| −5 | +15 |
| −3 | +10 |
| 0 | 0 |
| 3 | −10 |
| 5 | −15 |

102: MASTER ENVIRONMENT VALUE TABLE

| NUMBER OF TIMES OF COMMUNICATION | TEMPERATURE | REMARKS |
|---|---|---|
| 5 TIMES | 30 DEGREES | - |
| 10 TIMES | 32 DEGREES | - |
| 15 TIMES | 33 DEGREES | - |
| ... | ... | ... |
| 100 TIMES | 50 DEGREES | - |
| 105 TIMES | 50 DEGREES | SATURATED |

SLAVE EQUIPMENT, COMPUTER READABLE MEDIUM, AND EMBEDDED SYSTEM

CROSS REFERENCE TO RELATED APPLICATIONS

This application is a Continuation of PCT International Application No. PCT/JP2019/009695 filed on Mar. 11, 2019, which is hereby expressly incorporated by reference into the present application.

TECHNICAL FIELD

The present invention relates to time synchronization between a master node and a slave node.

BACKGROUND ART

In order to synchronize time of a master node with time of a slave node, a synchronization frame is periodically communicated between the master node and the slave node.

In Patent Literature 1, a method for correcting a time error in a single embedded device is disclosed.

The single embedded device includes an RTC and a system clock. The method disclosed in Patent Literature 1 enables correction of an error between time indicated by the RTC and time indicated by the system clock. The RTC is an abbreviation for real time clock.

CITATION LIST

Patent Literature

Patent Literature 1: JP 2017-020852

SUMMARY OF INVENTION

Technical Problem

In order that a state of time synchronization between the master node and the slave node may be maintained, increase in a frequency of communication of the synchronization frame is required. The increase in the frequency of communication of the synchronization frame, however, causes increase in communication traffic of the synchronization frame and increase in a processing load for the communication of the synchronization frame. In that case, communication of a control frame from the master node to the slave node may be influenced by the communication of the synchronization frame, so that the slave node may not operate correctly.

The method disclosed in Patent Literature 1 is a method for the single embedded device and thus cannot be applied, without modification, to the time synchronization between nodes in which various types of frames are communicated.

The present invention aims at enabling the time synchronization between nodes while reducing the communication traffic of the synchronization frame.

Solution to Problem

Slave equipment according to the present invention operates in accordance with a control frame transmitted from master equipment.

the slave equipment comprising:
a slave clock that is a clock device;
a statistic calculation unit to calculate a control frame statistic that is a statistic of one or more control frames transmitted from the master equipment;
a master environment value estimation unit to estimate a master environment value representing an operation environment of the master equipment, based on the calculated control frame statistic;
a slave environment value measurement unit to measure a slave environment value representing an operation environment of the slave equipment;
a frequency deviation estimation unit to estimate a frequency deviation of a master clock included in the master equipment, based on the estimated master environment value and to estimate a frequency deviation of the slave clock based on the measured slave environment value; and
a clock correction unit to modify a clock value of the slave clock based on a difference between the frequency deviation of the master clock and the frequency deviation of the slave clock.

Advantageous Effects of Invention

According to the present invention, time synchronization between master equipment and slave equipment can be attained based on a statistic of one or more control frames transmitted from the master equipment to the slave equipment. That is, the time synchronization between nodes can be carried out while communication traffic of a synchronization frame is reduced.

BRIEF DESCRIPTION OF DRAWINGS

FIG. 7 is a diagram illustrating a master frequency deviation table 101 in Embodiment 1.

DESCRIPTION OF EMBODIMENTS

Figure 1:
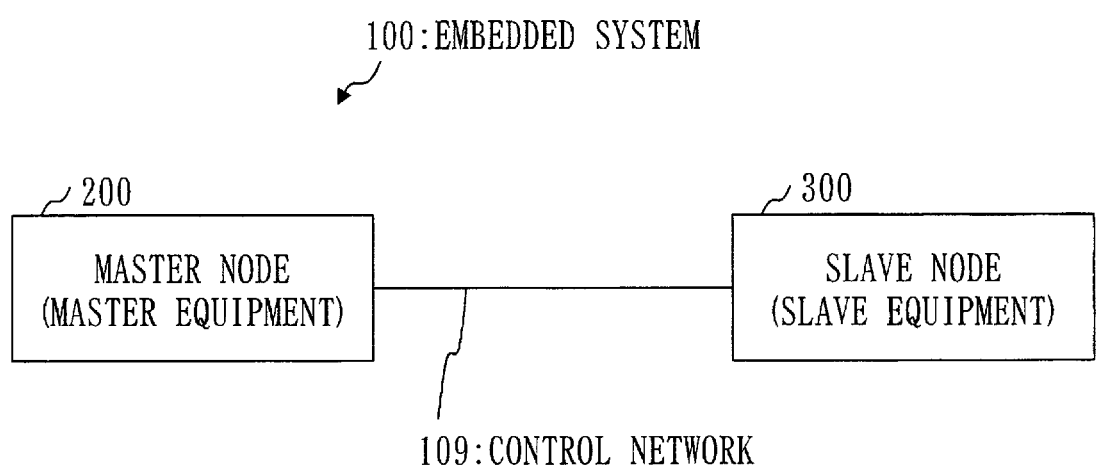
FIG. 1 is a configuration diagram of an embedded system 100 in Embodiment 1.

In an embodiment and the drawings, identical elements or corresponding elements are provided with identical reference characters. Description of elements provided with the same reference characters as reference characters of described elements is omitted or simplified appropriately. Arrows in the drawings mainly designate flow of data or flow of processes.

Embodiment 1

Time synchronization between a master node and a slave node will be described based on FIGS. 1 to 16.

\*\*\*Description of Configuration\*\*\*

Based on FIG. 1, a configuration of an embedded system 100 will be described.

The embedded system 100 includes a master node 200 and a slave node 300.

The master node 200 is embedded equipment included in the embedded system 100 and may be referred to as "master equipment".

The slave node 300 is embedded equipment included in the embedded system 100 and may be referred to as "slave equipment".

The master node 200 and the slave node 300 communicate through a control network 109.

The control network 109 is a communication network in the embedded system 100.

The master node 200 transmits a control frame to the slave node 300 and the slave node 300 operates in accordance with the control frame. Thus the master node 200 and the slave node 300 carry out a synchronization process.

For instance, the master node 200 is equipment to control a motor at one end of a belt conveyor and the slave node 300 is equipment to control a motor at the other end of the belt conveyor. The master node 200 and the slave node 300 need to make the motors at both the ends of the belt conveyor operate synchronously.

Figure 2:
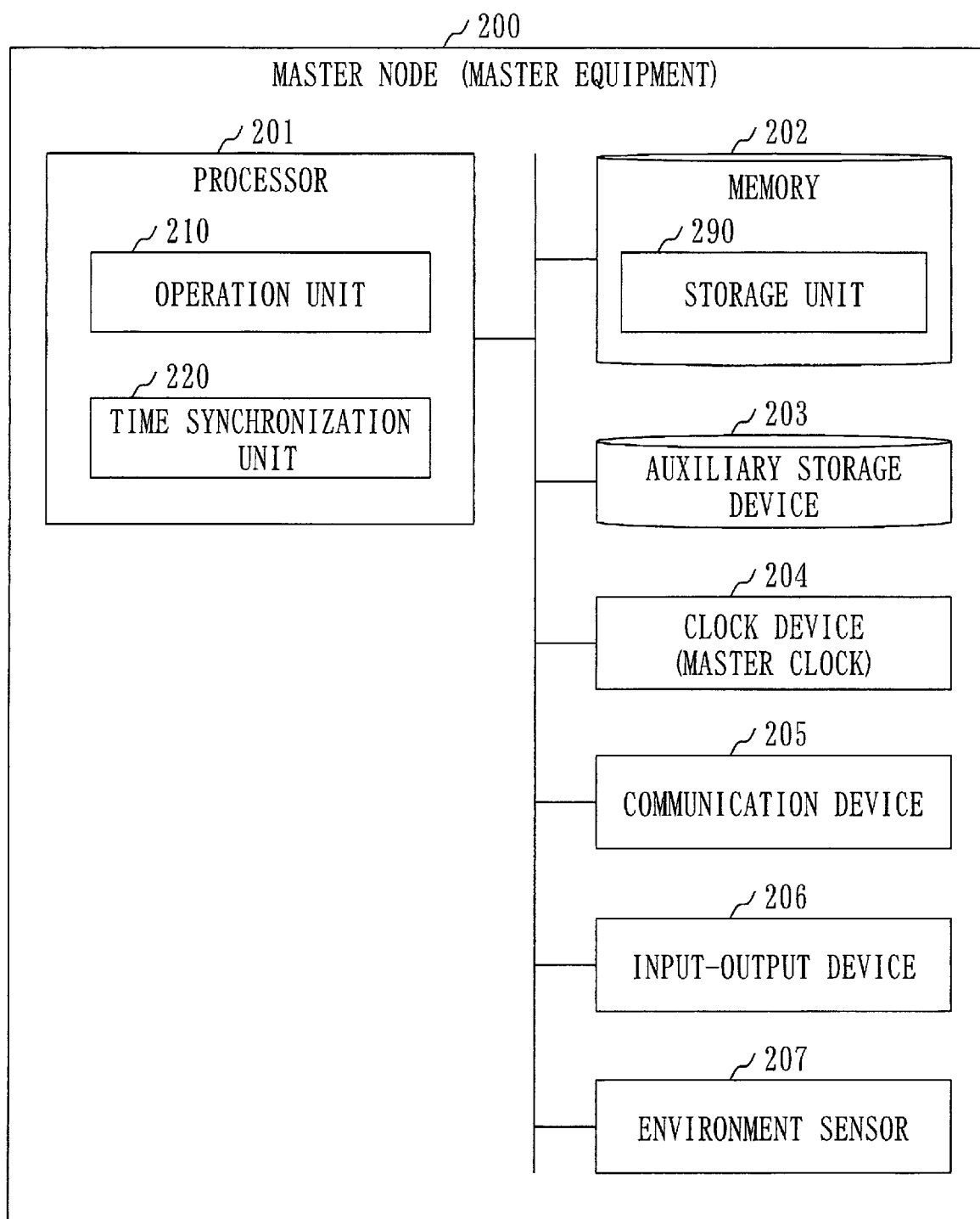
FIG. 2 is a configuration diagram of a master node 200 in Embodiment 1.

Based on FIG. 2, a configuration of the master node 200 will be described.

The master node 200 is a computer including hardware such as a processor 201, a memory 202, an auxiliary storage device 203, a clock device 204, a communication device 205, and an input-output device 206. The hardware is mutually connected through signal lines.

The processor 201 is an IC to carry out arithmetic processing and controls the other hardware devices. The processor 201 is a CPU, a DSP, or a GPU, for instance.

The IC is an abbreviation for Integrated Circuit.
The CPU is an abbreviation for Central Processing Unit.
The DSP is an abbreviation for Digital Signal Processor.
The GPU is an abbreviation for Graphics Processing Unit.

The memory 202 is a volatile storage device. The memory 202 may be referred to as a main storage or a main memory. The memory 202 is a RAM, for instance. Data stored in the memory 202 is saved in the auxiliary storage device 203 as appropriate.

The RAM is an abbreviation for Random Access Memory.

The auxiliary storage device 203 is a nonvolatile storage device. The auxiliary storage device 203 is a ROM, an HDD, or a flash memory, for instance. Data stored in the auxiliary storage device 203 is loaded into the memory 202 as appropriate.

The ROM is an abbreviation for Read Only Memory.
The HDD is an abbreviation for Hard Disk Drive.

The clock device 204 is a device to output a clock signal representing time. The clock device 204 is a crystal oscillator and includes a crystal resonator, for instance.

The clock device 204 may be referred to as "master clock".

The communication device 205 includes a receiver and a transmitter. The communication device 205 is a communication chip or an NIC, for instance. Communication for the master node 200 is carried out with use of the communication device 205.

The NIC is an abbreviation for Network Interface Card.

The input-output device 206 includes an input device and an output device. The input-output device 206 includes a sensor, an LED, a motor, and the like, for instance.

The LED is an abbreviation for Light Emitting Diode.

An environment sensor 207 is a sensor to measure an operation environment of the master node 200. The environment sensor 207 is a thermometer, a gyro, a voltmeter, or the like, for instance.

The master node 200 includes elements such as an operation unit 210 and a time synchronization unit 220. These elements are implemented by software.

In the auxiliary storage device 203, master programs (an operation program and a time synchronization program) to make the computer function as the operation unit 210 and the time synchronization unit 220 are stored. The master programs are loaded into the memory 202 and are executed by the processor 201.

In the auxiliary storage device 203, an OS is further stored. At least a portion of the OS is loaded into the memory 202 and is executed by the processor 201.

The processor 201 executes the master programs while executing the OS.

The OS is an abbreviation for Operating System.

Input-output data for the master programs is stored in a storage unit 290.

The memory 202 functions as the storage unit 290. In place of or in cooperation with the memory 202, however, storage devices such as the auxiliary storage device 203, a register in the processor 201, and a cache memory in the processor 201 may function as the storage unit 290.

The master node 200 may include a plurality of processors to substitute for the processor 201. The plurality of processors share roles of the processor 201.

The master programs may be computer-readably recorded (stored) in a nonvolatile recording medium such as an optical disc or a flash memory.

Figure 3:
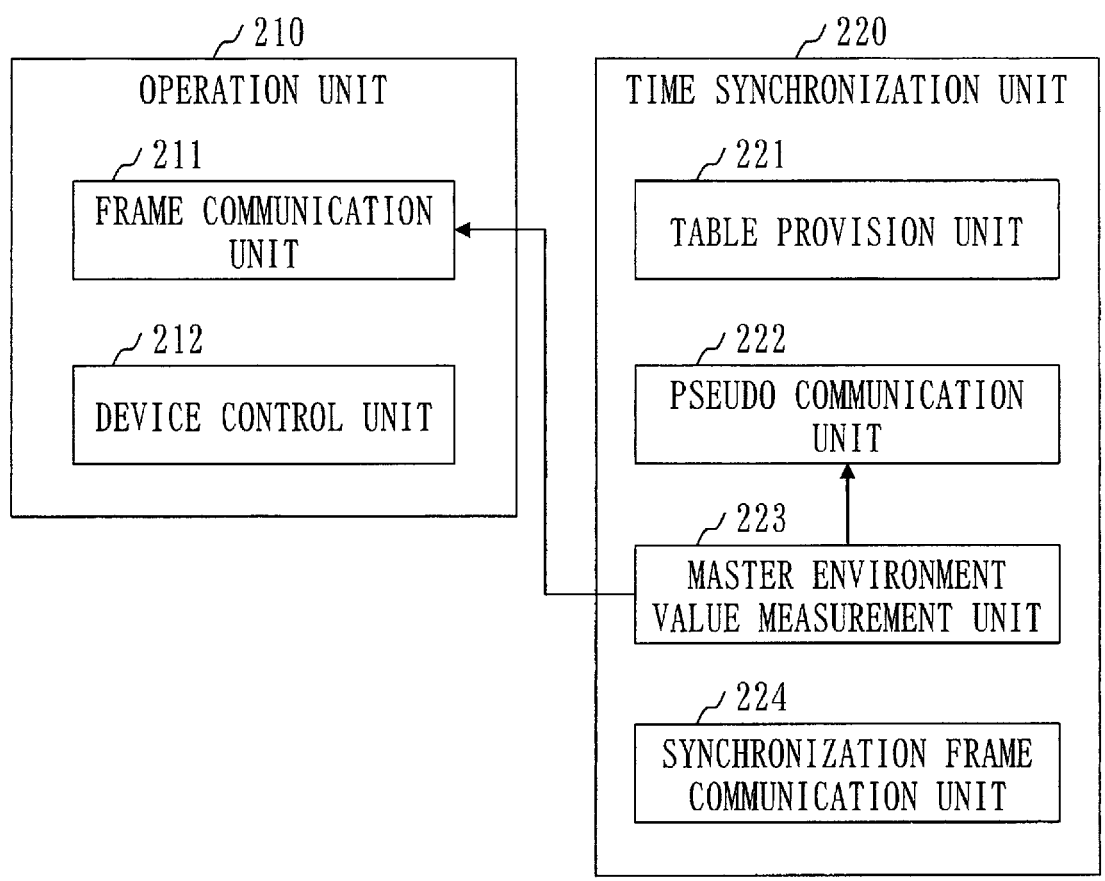
FIG. 3 is a configuration diagram of an operation unit 210 and a time synchronization unit 220 in Embodiment 1.

Based on FIG. 3, each of configurations of the operation unit 210 and the time synchronization unit 220 will be described.

The operation unit 210 includes a frame communication unit 211 and a device control unit 212.

The time synchronization unit 220 includes a table provision unit 221, a pseudo communication unit 222, a master environment value measurement unit 223, and a synchronization frame communication unit 224.

Functions of those elements will be described later.

Figure 4:
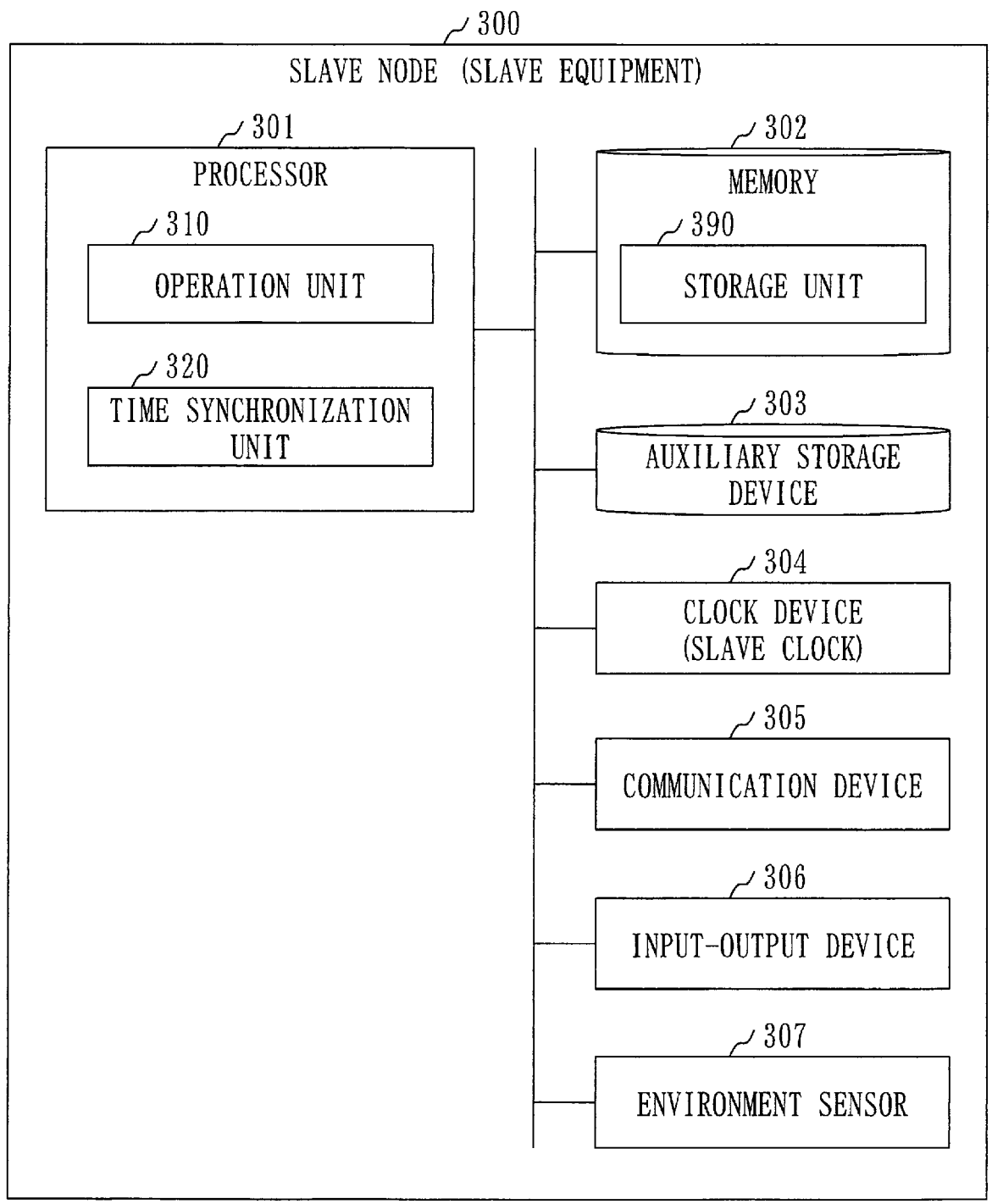
FIG. 4 is a configuration diagram of a slave node 300 in Embodiment 1.

Based on FIG. 4, a configuration of the slave node 300 will be described.

The slave node 300 is a computer including hardware such as a processor 301, a memory 302, an auxiliary storage device 303, a clock device 304, a communication device 305, and an input-output device 306. The hardware is mutually connected through signal lines.

The processor 301 is an IC to carry out arithmetic processing and controls the other hardware devices. The processor 301 is a CPU, a DSP, or a GPU, for instance.

The memory 302 is a volatile storage device. The memory 302 may be referred to as a main storage or a main memory. The memory 302 is a RAM, for instance. Data stored in the memory 302 is saved in the auxiliary storage device 303 as appropriate.

The auxiliary storage device 303 is a nonvolatile storage device. The auxiliary storage device 303 is a ROM, an HDD, or a flash memory, for instance. Data stored in the auxiliary storage device 303 is loaded into the memory 302 as appropriate.

The clock device 304 is a device to output a clock signal representing time. The clock device 304 is a crystal oscillator and includes a crystal resonator, for instance.

The clock device 304 may be referred to as "slave clock".

The communication device 305 includes a receiver and a transmitter. The communication device 305 is a communication chip or an NIC, for instance. Communication for the slave node 300 is carried out with use of the communication device 305.

The input-output device 306 includes an input device and an output device. The input-output device 306 includes a sensor, an LED, a motor, and the like, for instance.

An environment sensor 307 is a sensor to measure an operation environment of the slave node 300. The environment sensor 307 is a thermometer, a gyro, a voltmeter, or the like, for instance.

The slave node 300 includes elements such as an operation unit 310 and a time synchronization unit 320. These elements are implemented by software.

In the auxiliary storage device 303, slave programs (an operation program and a time synchronization program) to make the computer function as the operation unit 310 and the time synchronization unit 320 are stored. The slave programs are loaded into the memory 302 and are executed by the processor 301.

In the auxiliary storage device 303, an OS is further stored. At least a portion of the OS is loaded into the memory 302 and is executed by the processor 301.

The processor 301 executes the slave programs while executing the OS.

Input-output data for the slave programs is stored in a storage unit 390.

The memory 302 functions as the storage unit 390. In place of or in cooperation with the memory 302, however, storage devices such as the auxiliary storage device 303, a register in the processor 301, and a cache memory in the processor 301 may function as the storage unit 390.

The slave node 300 may include a plurality of processors to substitute for the processor 301. The plurality of processors share roles of the processor 301.

The slave programs may be computer-readably recorded (stored) in a nonvolatile recording medium such as an optical disc or a flash memory.

Figure 5:
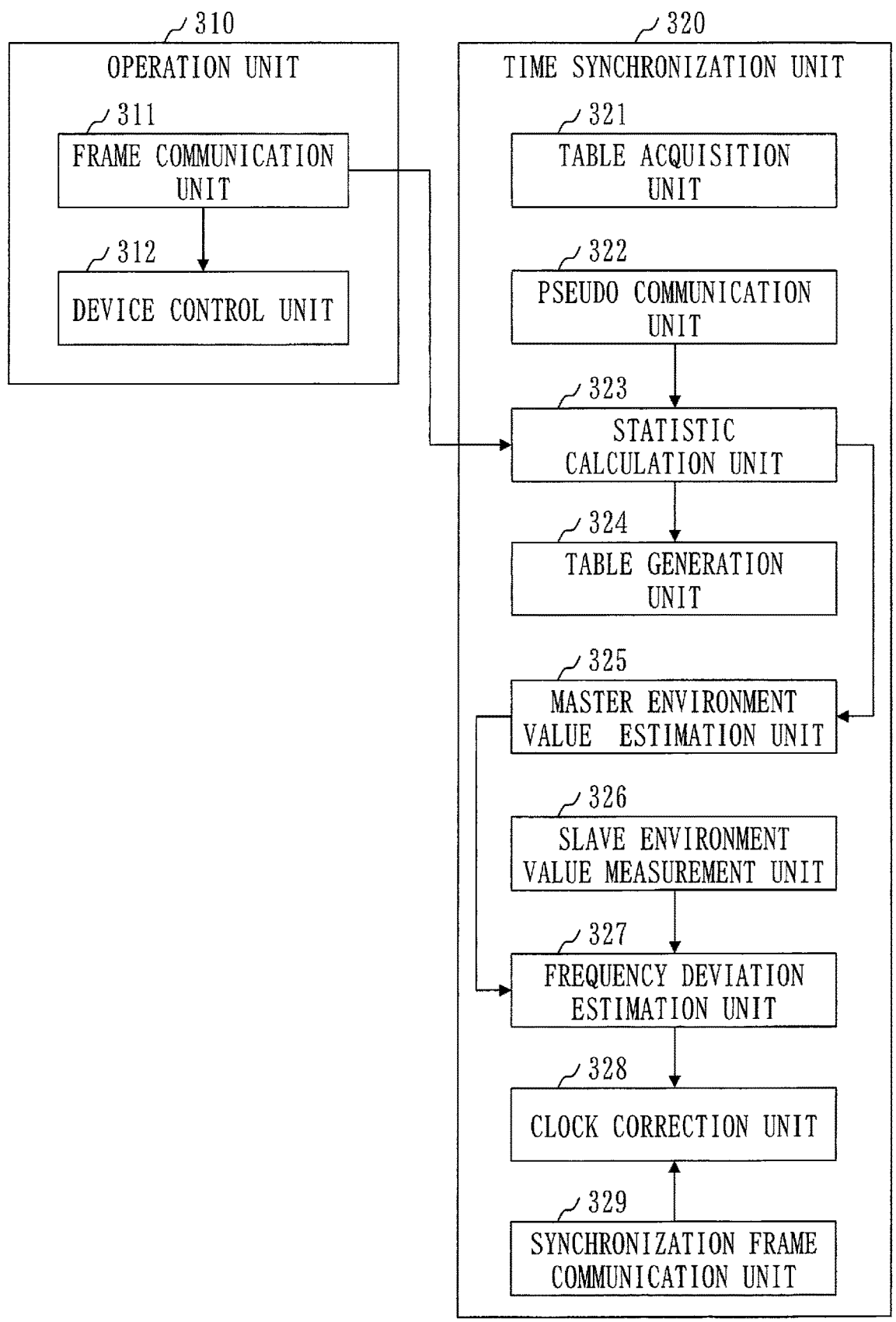
FIG. 5 is a configuration diagram of an operation unit 310 and a time synchronization unit 320 in Embodiment 1.

Based on FIG. 5, each of configurations of the operation unit 310 and the time synchronization unit 320 will be described.

The operation unit 310 includes a frame communication unit 311 and a device control unit 312.

The time synchronization unit 320 includes a table acquisition unit 321, a pseudo communication unit 322, a statistic calculation unit 323, a table generation unit 324, a master environment value estimation unit 325, a slave environment value measurement unit 326, a frequency deviation estimation unit 327, a clock correction unit 328, and a synchronization frame communication unit 329.

Functions of those elements will be described later.

*Description of Operation*

Operation of the time synchronization unit 220 of the master node 200 and operation of the time synchronization unit 320 of the slave node 300 are equivalent to a time synchronization method. Additionally, a procedure of the time synchronization method is equivalent to a procedure of a time synchronization program.

The time synchronization method includes a tuning phase and an operation phase.

The tuning phase is carried out before the operation phase. In the tuning phase, a preparation for the time synchronization in the operation phase is made. The tuning phase is carried out at times of turn of seasons, rearrangement of lines in the embedded system 100, and the like, for instance. Timing when the tuning phase is carried out is appropriately determined by a user.

The operation phase is carried out after the tuning phase. In the operation phase, the slave node 300 operates in accordance with the control frame while ensuring the time synchronization with the master node 200.

Figure 6:
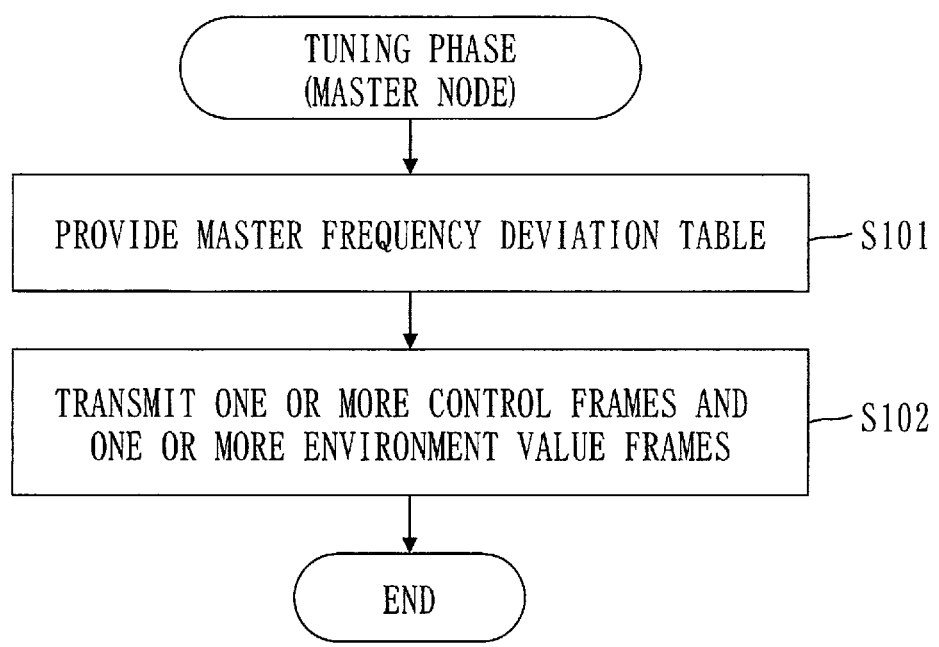
FIG. 6 is a flowchart of a tuning phase (master node) in Embodiment 1.

Based on FIG. 6, operation of the master node 200 in the tuning phase will be described.

In step S101, the table provision unit 221 provides a master frequency deviation table 101 for the slave node 300.

The master frequency deviation table 101 is data indicating relation between master environment values and master frequency deviations. In the master frequency deviation table 101, one or more master environment values and one or more master frequency deviations are mutually associated.

The master environment values are values representing the operation environment of the master node 200. The master environment values are temperatures, accelerations, voltages, or the like, for instance. Specifically, the master environment values include temperatures of the master clock.

The master frequency deviations are frequency deviations of the master clock.

The table provision unit 221 provides the master frequency deviation table 101 as follows.

The master frequency deviation table 101 has been stored in advance in the storage unit 390.

The table provision unit 221 transmits the master frequency deviation table 101 to the slave node 300.

In FIG. 7, a specific example of the master frequency deviation table 101 is illustrated.

The master frequency deviation table 101 includes one or more records. The records each include a "TEMPERATURE" column and a "FREQUENCY DEVIATION" column and each associate the "TEMPERATURE" column and the "FREQUENCY DEVIATION" column with each other.

The "TEMPERATURE" column indicates a relative temperature of the master clock. The relative temperature of the master clock is an example of the master environment value.

The "FREQUENCY DEVIATION" column indicates a relative value of the frequency deviation of the master clock.

In case where the temperature of the master clock decreases by 10 degrees, for instance, the frequency deviation of the master clock increases by 10.

With return to FIG. 6, description will be continued from step S102.

In step S102, the pseudo communication unit 222 generates one or more control frames and transmits the one or more generated control frames to the slave node 300.

In addition, the pseudo communication unit 222 generates one or more environment value frames and transmits the one or more generated environment value frames to the slave node 300.

The control frame is a frame indicating a content of control directed to the slave node 300.

The environment value frame is a frame indicating the master environment value.

Specifically, the pseudo communication unit 222 continues to transmit the control frames and the environment value frames to the slave node 300 until the master environment value is saturated. A transmission interval for the control frames and a transmission interval for the environment value frames may be the same or may be different.

A content of the control frame is similar to the content in the operation phase.

The pseudo communication unit 222 generates the control frames by simulating operation of the frame communication unit 211 in the operation phase.

The environment value frame is generated as follows.

The master environment value measurement unit 223 measures the master environment value with use of the environment sensor 207.

The pseudo communication unit 222 generates a frame including the measured master environment value. The generated frame is the environment value frame.

Figure 8:
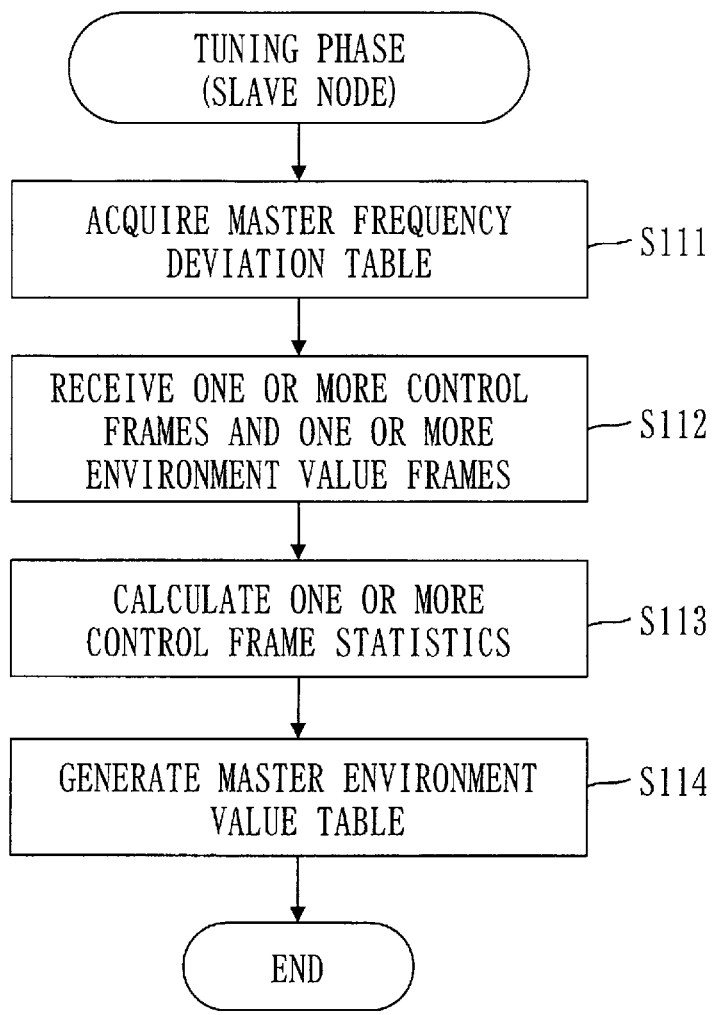
FIG. 8 is a flowchart of the tuning phase (slave node) in Embodiment 1.

Based on FIG. 8, operation of the slave node 300 in the tuning phase will be described.

In step S111, the table acquisition unit 321 acquires the master frequency deviation table from the master node 200.

Specifically, the table acquisition unit 321 receives the master frequency deviation table transmitted from the master node 200. Then the table acquisition unit 321 saves the received master frequency deviation table in the storage unit 290.

In step S112, the pseudo communication unit 322 receives one or more control frames and one or more environment value frames from the master node 200.

Specifically, the pseudo communication unit 322 receives the control frames that are transmitted periodically from the master node 200. In addition, the pseudo communication unit 322 receives the environment value frames that are transmitted periodically from the master node 200.

In step S113, the statistic calculation unit 323 calculates one or more control frame statistics based on the one or more received control frames.

The control frame statistics are statistics of the communicated control frames. The control frame statistics include a number of times of communication of the control frames, a total size of the control frames, or a statistic of the control content, for instance. The statistic of the control content is a total of numbers of revolutions of the motors, for instance.

Specifically, the statistic calculation unit 323 calculates the control frame statistics each time a specified number of control frames are received.

In step S114, the table generation unit 324 generates a master environment value table 102 with use of the one or more control frame statistics and the one or more master environment values indicated by the one or more environment value frames.

Then the table generation unit 324 saves the master environment value table 102 in the storage unit 390.

The master environment value table 102 is data indicating relation between the control frame statistics and the master environment values.

The table generation unit 324 generates the master environment value table 102 as follows.

The table generation unit 324 acquires the control frame statistics from the statistic calculation unit 323 each time a specified number of control frames are received.

Each time an environment value frame following (or preceding) a control frame in a place of a specified number is received, the table generation unit 324 acquires the master environment value from the received environment value frame.

Then the table generation unit 324 generates a record including the control frame statistic and the master environment value and registers the generated record in the master environment value table 102.

Figure 9:
FIG. 9 is a diagram illustrating a master environment value table 102 in Embodiment 1.

In FIG. 9, a specific example of the master environment value table 102 is illustrated.

The master environment value table 102 includes one or more records. The records each include a "NUMBER OF TIMES OF COMMUNICATION" column, a "TEMPERATURE" column, and a "REMARKS" column and each associate the "NUMBER OF TIMES OF COMMUNICATION" column, the "TEMPERATURE" column, and the "REMARKS" column with one other.

The "NUMBER OF TIMES OF COMMUNICATION" column indicates the number of times the control frames have been communicated (number of times of communication). The number of times of communication is an example of the control frame statistic.

The "TEMPERATURE" column indicates an absolute temperature of the master clock. The absolute temperature of the master clock is an example of the master environment value.

The "REMARKS" column indicates whether the absolute temperature of the master clock is saturated or not. On condition that the control frames have been communicated 100 times, the absolute temperature of the master clock is 50 degrees. On condition that the control frames have been communicated 105 times, the absolute temperature of the master clock is 50 degrees. At this time, the absolute temperature of the master clock has not changed and is thus saturated.

Subsequently, the operation phase will be described.

In the master node 200, the frame communication unit 211 generates the control frames and transmits the control frames to the slave node 300 in accordance with operation algorithm. In addition, the device control unit 212 controls the input-output device 206 in accordance with the operation algorithm. The operation algorithm is algorithm described in the operation program.

In the slave node 300, the frame communication unit 311 receives the control frames from the master node 200 and acquires the control content from the received control frames. Then the device control unit 312 controls the input-output device 306 in accordance with the acquired control content.

The synchronization frame communication unit 329 of the slave node 300 periodically communicates the synchronization frame with the synchronization frame communication unit 224 of the master node 200 and sets a clock value of the slave clock with a clock value of the master clock, based on the communicated synchronization frame. The synchronization frame is a frame to be communicated for the time synchronization. The time synchronization based on the synchronization frame is a prior art technique.

The slave node 300 carries out the time synchronization based on the control frames in order to reduce the communication traffic of the synchronization frame, that is, in order to prolong a communication interval for the synchronization frame.

Figure 10:
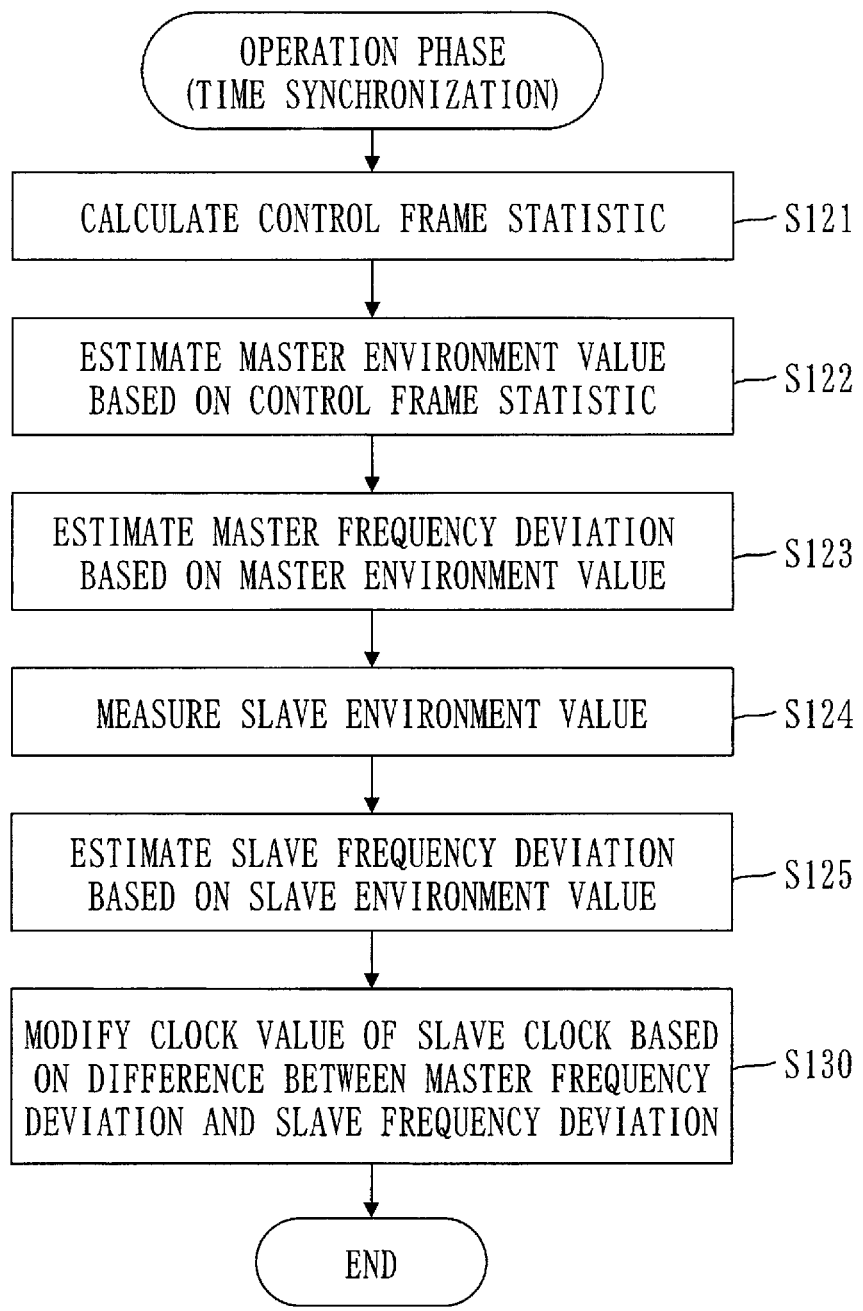
FIG. 10 is a flowchart of an operation phase (time synchronization) in Embodiment 1.

Based on FIG. 10, the time synchronization that is carried out by the slave node 300 and that is based on the control frames will be described.

The time synchronization based on the control frames is periodically carried out. The time synchronization unit 320 carries out the time synchronization based on the control frames each time a specified number of control frames are received or each time a specified time period elapses, for instance.

In step S121, the statistic calculation unit 323 makes a calculation of the control frame statistic.

A method of the calculation is the same as a method in step S113. The statistic calculation unit 323 calculates the number of times of communication of the control frames in the operation phase, for instance.

In step S122, the master environment value estimation unit 325 estimates the master environment value based on the control frame statistic.

Specifically, the master environment value estimation unit 325 estimates the master environment value with use of the master environment value table 102.

Based on FIG. 9, the specific example of the master environment value that is estimated will be described.

It is assumed that the number of times of communication of the control frames (control frame statistic) is "15".

In this case, the master environment value estimation unit 325 acquires a temperature "33 DEGREES" associated with the number of times of communication "15 TIMES" from the master environment value table 102. The acquired temperature "33 DEGREES" is the estimated master environment value.

With return to FIG. 10, the description will be continued from step S123.

In step S123, the frequency deviation estimation unit 327 estimates the frequency deviation of the master clock based on the estimated master environment value. The frequency deviation of the master clock is referred to as "master frequency deviation".

Specifically, the frequency deviation estimation unit 327 estimates the master frequency deviation with use of the master frequency deviation table 101.

Based on FIG. 7, specific examples of the estimated master frequency deviation will be described.

It is assumed that the master environment value in last time is "30 degrees" and that the master environment value in this time is "33 degrees". An amount of change in the master environment value is "3 degrees".

In this case, the frequency deviation estimation unit 327 acquires a frequency deviation "−10" corresponding to the amount of change "3 degrees" in the master environment value, from the master frequency deviation table 101. The acquired frequency deviation "−10" is the estimated master frequency deviation.

With return to FIG. 10, the description will be continued from step S124.

In step S124, the slave environment value measurement unit 326 measures a slave environment value with use of the environment sensor 307.

In step S125, the frequency deviation estimation unit 327 estimates the frequency deviation of the slave clock based on the measured slave environment value. The frequency deviation of the slave clock is referred to as "slave frequency deviation".

The frequency deviation estimation unit 327 estimates the slave frequency deviation as follows.

A slave frequency deviation table that is equivalent to the master frequency deviation table 101 has been stored in advance in the storage unit 390.

The slave frequency deviation table is data indicating relation between the slave environment values and the slave frequency deviations. In the slave frequency deviation table, one or more slave environment values and one or more slave frequency deviations are mutually associated.

The frequency deviation estimation unit 327 estimates the slave frequency deviation with use of the slave frequency deviation table. A method of such estimation is similar to a method in step S123.

In step S130, the clock correction unit 328 modifies the clock value of the slave clock based on a difference between the estimated master frequency deviation and the estimated slave frequency deviation.

Figure 11:
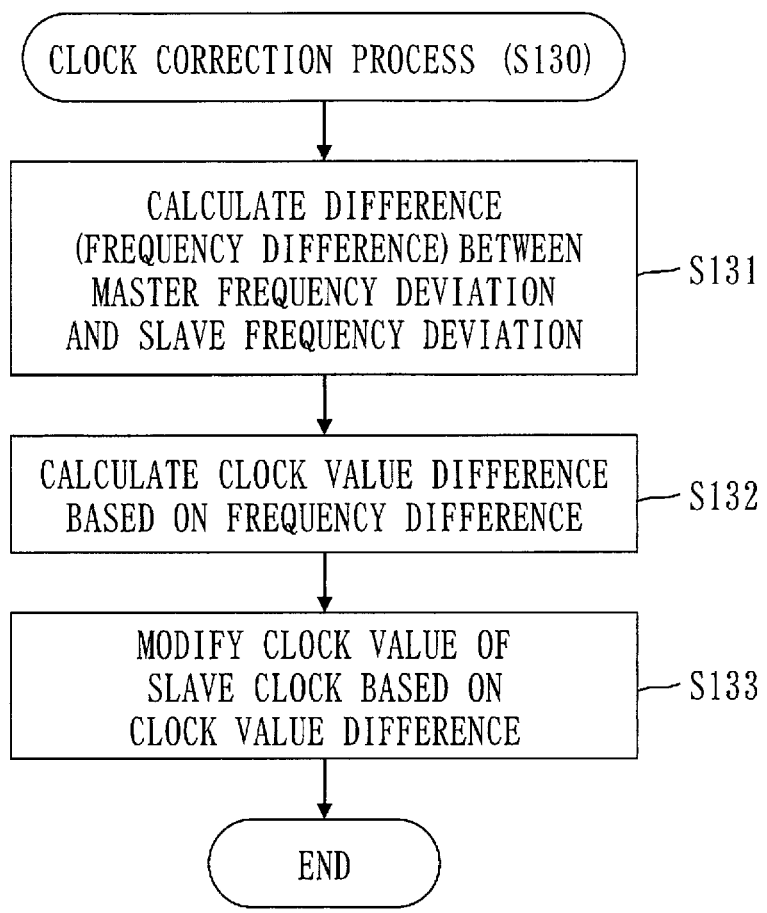
FIG. 11 is a flowchart of a clock correction process (S130) in Embodiment 1.

Based on FIG. 11, a procedure of a clock correction process (S130) will be described.

In step S131, the clock correction unit 328 calculates the difference between the master frequency deviation and the slave frequency deviation. The calculated difference is referred to as "frequency difference".

The frequency difference is equivalent to a difference between a frequency of the master clock and a frequency of the slave clock.

In step S132, the clock correction unit 328 calculates a clock value difference based on the frequency difference.

The clock value difference is a difference between the clock value of the master clock and the clock value of the slave clock.

The clock correction unit 328 calculates the clock value difference as follows.

Each time the clock correction process (S130) is executed, the clock correction unit 328 measures lapse time from last execution time.

Then the clock correction unit 328 multiplies the frequency difference by the lapse time. A resultant value is the clock value difference.

In step S133, the clock correction unit 328 modifies the clock value of the slave clock based on the clock value difference.

That is, the clock correction unit 328 corrects the clock value of the slave clock to a value resulting from a change by the clock value difference.

The clock correction unit 328 modifies the clock value of the slave clock a plurality of times in a split manner by next clock correction process (S130), for instance. The clock correction unit 328, however, may modify the clock value of the slave clock at one time.

\*\*\*Effects of Embodiment 1\*\*\*

Based on FIGS. 12 to 14, problems that are solved by Embodiment 1 will be described.

A master clock value is the clock value of the master clock.

A slave clock value is the clock value of the slave clock.

Figure 12:
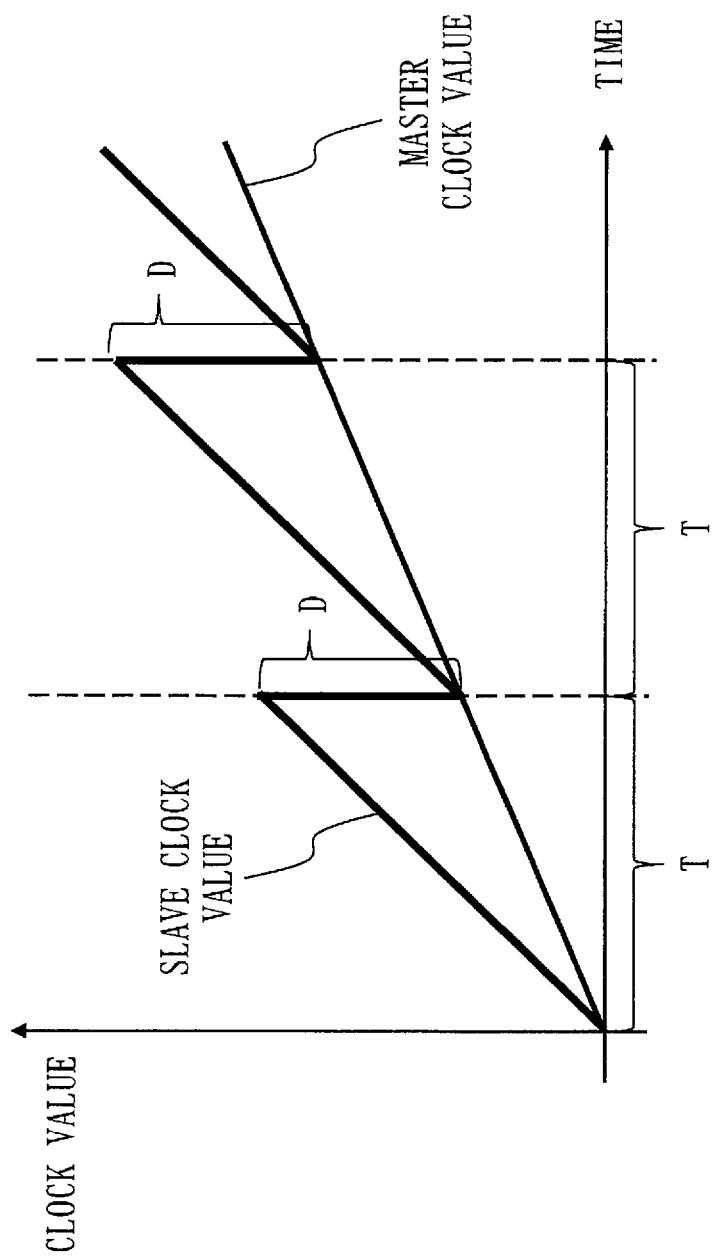
FIG. 12 is an explanatory diagram for problems in Embodiment 1.

As illustrated in FIG. 12, on condition that both of the frequency of the master clock and the frequency of the slave clock are constant, the clock value difference D in synchronization cycles T is constant. In this case, the master clock and the slave clock can be synchronized, providing that the slave clock value is changed by the clock value difference D each time the synchronization cycle T elapses.

In general, however, a clock device including a crystal oscillator is used as the slave clock. Therefore, the frequency of the slave clock changes in accordance with a change in an external environment (temperature, primarily).

Figure 13:
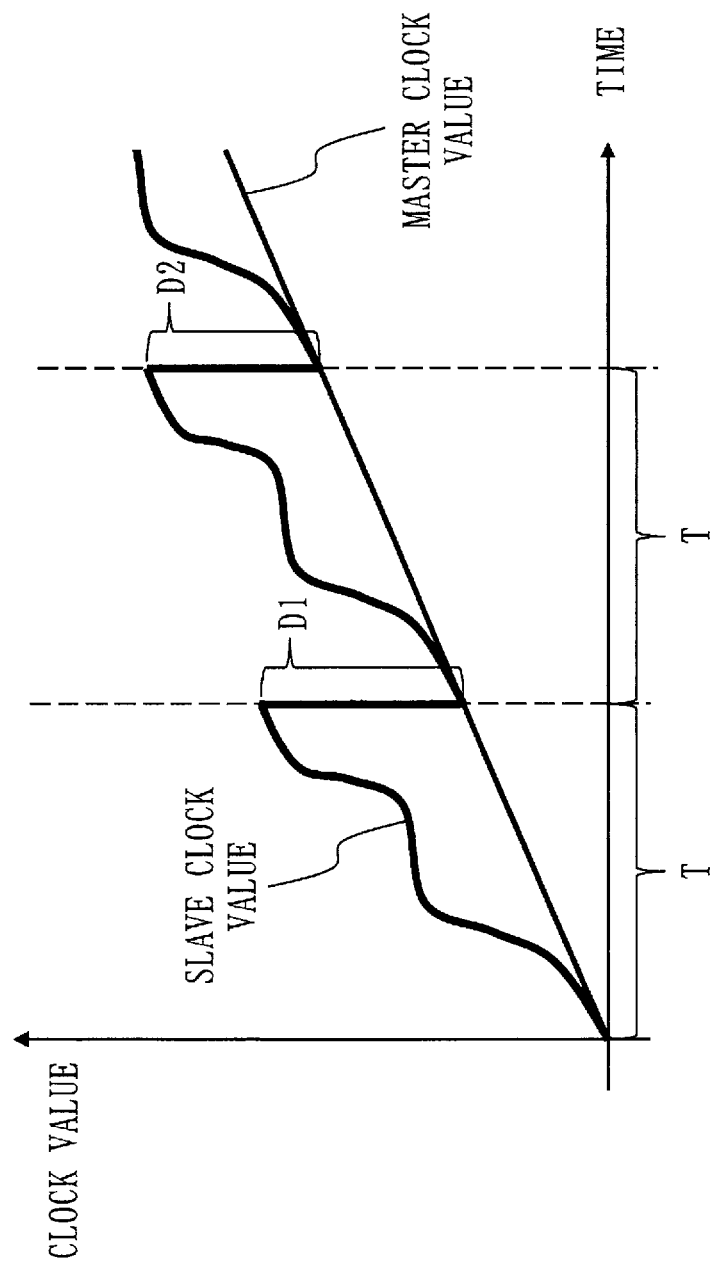
FIG. 13 is an explanatory diagram for the problems in Embodiment 1.

As illustrated in FIG. 13, on condition that the frequency of the slave clock is not constant even though the frequency of the master clock is constant, a change occurs in the clock value difference (D1, D2) in the synchronization cycles T. Meanwhile, a frequency-temperature characteristic is generally known as a characteristic of a crystal oscillator. In the slave node, therefore, measurement of a temperature of the crystal oscillator of the slave clock enables estimation of the frequency deviation of the slave clock based on the measured temperature and the frequency-temperature characteristic of the crystal oscillator of the slave clock.

Therefore, the slave node estimates the frequency deviation of the slave clock, each time the synchronization cycle T elapses, estimates the clock value difference (D1, D2) based on the estimated frequency deviation, and changes the slave clock value by the estimated clock value difference (D1, D2). Thus the slave clock can be synchronized with the master clock.

In contrast to an artificial satellite in which an atomic clock is used as a clock device, however, a clock device including a crystal oscillator is generally used as the master clock. Therefore, the frequency of the master clock changes in accordance with a change in the external environment (temperature, primarily).

Figure 14:
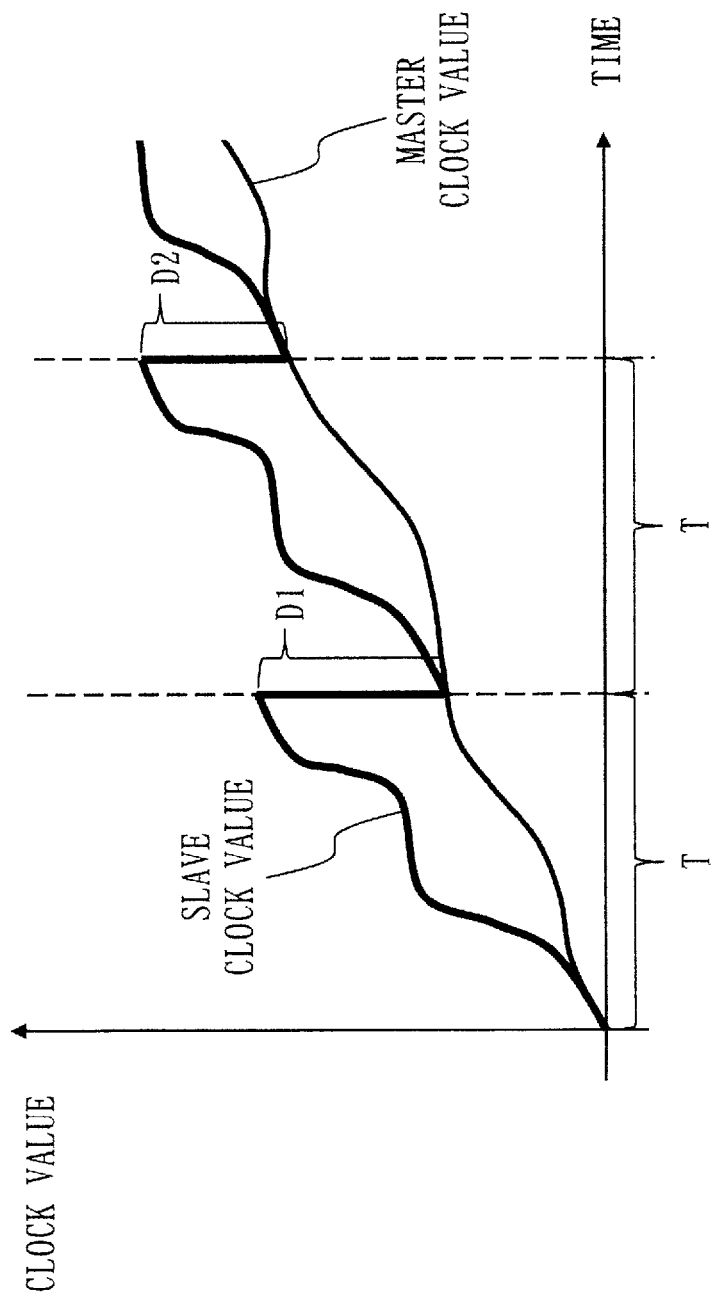
FIG. 14 is an explanatory diagram for the problems in Embodiment 1.

As illustrated in FIG. 14, the frequency of the master clock changes in accordance with the external environment of the master node and the frequency of the slave clock changes in accordance with the external environment (temperature) of the slave node. Therefore, a change occurs in the clock value difference (D1, D2) in the synchronization cycles T.

The slave node is capable of estimating the frequency of the slave clock based on the temperature of the crystal oscillator of the slave clock.

The slave node, however, is incapable of estimating the frequency of the master clock because the slave node does not know the temperature of the crystal oscillator of the master clock. In order to avoid influence on the communication of the control frames in the operation phase, it is desirable not to communicate the environment value frames that are for notification of the temperature of the crystal oscillator of the master clock.

Such effects as follows may be produced by Embodiment 1.

In the tuning phase, the slave node 300 receives one or more control frames and one or more environment value frames from the master node 200. Then the slave node 300 generates the master environment value table 102 indicating the relation between the control frame statistics and the master environment values.

In the operation phase, the slave node 300 calculates the control frame statistic based on the one or more control frames received from the master node 200. Then the slave node 300 estimates the master environment value based on the calculated control frame statistic and the master environment value table 102.

That is, the slave node 300 is capable of estimating the master environment value based on the communication of the control frames. Further, the slave node 300 is capable of estimating the frequency deviation of the master clock based on the estimated master environment value. Moreover, the slave node 300 is capable of modifying the clock value of the slave clock based on the difference between the frequency deviation of the slave clock and the frequency deviation of the master clock and thereby synchronizing the slave clock with the master clock.

As a result, the communication traffic of the synchronization frames can be reduced and, that is, the communication intervals for the synchronization frames can be prolonged.

*Supplementation to Embodiment*

Figure 15:
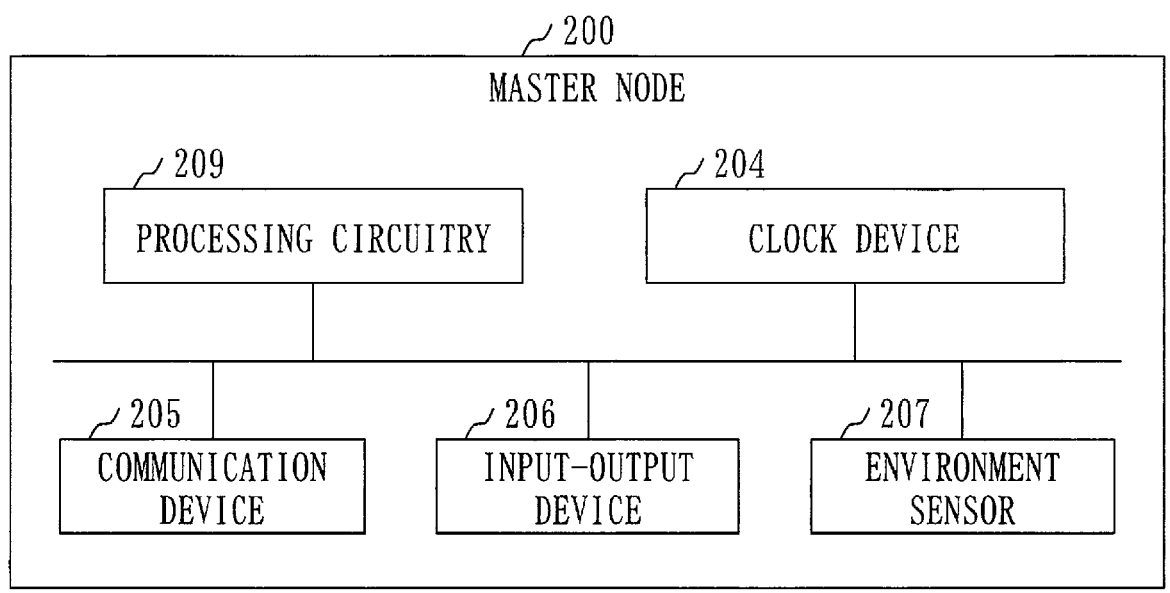
FIG. 15 is a hardware configuration diagram of the master node 200 in Embodiment 1.

Based on FIG. 15, a hardware configuration of the master node 200 will be described.

The master node 200 includes a processing circuitry 209.

The processing circuitry 209 is hardware that implements the operation unit 210 and the time synchronization unit 220.

The processing circuitry 209 may be dedicated hardware or may be the processor 201 that executes a program stored in the memory 202.

In case where the processing circuitry 209 is the dedicated hardware, the processing circuitry 209 is a single circuit, a composite circuit, a programmed processor, a parallel-programmed processor, an ASIC, an FPGA, or a combination thereof, for instance.

The ASIC is an abbreviation for Application Specific Integrated Circuit.

The FPGA is an abbreviation for Field Programmable Gate Array.

The master node 200 may include a plurality of processing circuits that substitute for the processing circuitry 209. The plurality of processing circuits share roles of the processing circuitry 209.

Some of functions of the master node 200 may be implemented by dedicated hardware and the remainder of the functions may be implemented by software or firmware.

Thus the processing circuitry 209 may be implemented by hardware, software, firmware, or a combination thereof.

Figure 16:
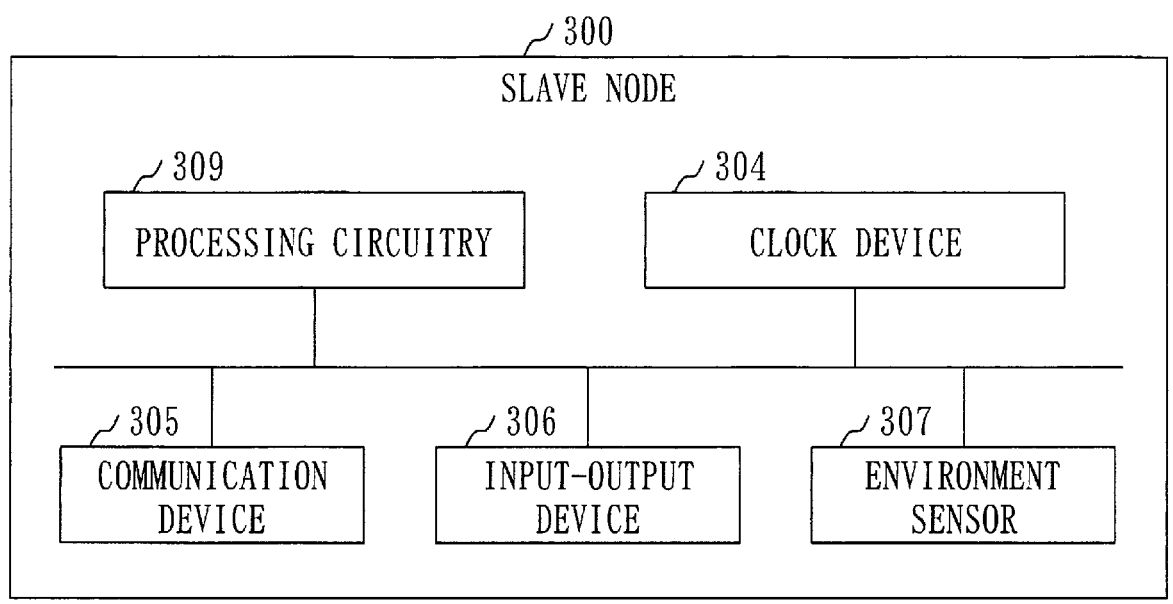
FIG. 16 is a hardware configuration diagram of the slave node 300 in Embodiment 1.

Based on FIG. 16, a hardware configuration of the slave node 300 will be described.

The slave node 300 includes a processing circuitry 309.

The processing circuitry 309 is hardware that implements the operation unit 310 and the time synchronization unit 320.

The processing circuitry 309 may be dedicated hardware or may be the processor 301 that executes a program stored in the memory 302.

In case where the processing circuitry 309 is the dedicated hardware, the processing circuitry 309 is a single circuit, a composite circuit, a programmed processor, a parallel-programmed processor, an ASIC, an FPGA, or a combination thereof, for instance.

The slave node 300 may include a plurality of processing circuits that substitute for the processing circuitry 309. The plurality of processing circuits share roles of the processing circuitry 309.

Some of functions of the slave node 300 may be implemented by dedicated hardware and the remainder of the functions may be implemented by software or firmware.

Thus the processing circuitry 309 may be implemented by hardware, software, firmware, or a combination thereof.

The embodiment exemplifies a preferred embodiment and is not intended to confine the technical scope of the present invention. The embodiment may be partially implemented or may be implemented in combination with other embodiments. The procedures described with use of the flowcharts or the like may be modified appropriately.

The "unit" that refers to each element of the master node 200 and the slave node 300 may be read as "process" or "step".

REFERENCE SIGNS LIST

100: embedded system; 101: master frequency deviation table; 102: master environment value table; 109: control network; 200: master node; 201: processor; 202: memory; 203: auxiliary storage device; 204: clock device; 205: communication device; 206: input-output device; 207: environment sensor; 209: processing circuitry; 210: operation unit; 211: frame communication unit; 212: device control unit; 220: time synchronization unit; 221: table provision unit; 222: pseudo communication unit; 223: master environment value measurement unit; 224: synchronization frame communication unit; 290: storage unit; 300: slave node; 301: processor; 302: memory; 303: auxiliary storage device; 304:

clock device; 305: communication device; 306: input-output device; 307: environment sensor; 309: processing circuitry; 310: operation unit; 311: frame communication unit; 312: device control unit; 320: time synchronization unit; 321: table acquisition unit; 322: pseudo communication unit; 323: statistic calculation unit; 324: table generation unit; 325: master environment value estimation unit; 326: slave environment value measurement unit; 327: frequency deviation estimation unit; 328: clock correction unit; 329: synchronization frame communication unit; 390: storage unit

The invention claimed is:

1. Slave equipment to operate in accordance with a control frame transmitted from master equipment, the slave equipment comprising:
 a slave clock that is a clock device; and
 processing circuitry to:
 calculate a control frame statistic that is a statistic of one or more control frames transmitted from the master equipment;
 estimate a master environment value representing an operation environment of the master equipment, based on the calculated control frame statistic;
 measure a slave environment value representing an operation environment of the slave equipment;
 estimate a frequency deviation of a master clock included in the master equipment, based on the estimated master environment value and to estimate a frequency deviation of the slave clock based on the measured slave environment value; and
 modify a clock value of the slave clock based on a value corresponding to a lapse time from the last execution of modifying the clock value of the slave clock multiplied by a difference between the frequency deviation of the master clock and the frequency deviation of the slave clock, wherein
 the master environment value corresponds to a temperature of the master clock and the slave environment value corresponds to a temperature of the slave clock.

2. The slave equipment according to claim 1, wherein the processing circuitry estimates the master environment value with use of a master environment value table indicating relation between the control frame statistic and the master environment value.

3. The slave equipment according to claim 2, wherein the master equipment transmits one or more control frames and one or more environment value frames indicating one or more master environment values in a tuning phase before an operation phase in which the slave equipment operates in accordance with the control frames, wherein
 the processing circuitry calculates one or more control frame statistics in the tuning phase based on the one or more control frames transmitted from the master equipment in the tuning phase, and
 generates the master environment value table with use of the one or more control frame statistics in the tuning phase and the one or more master environment values indicated by the one or more environment value frames transmitted from the master equipment in the tuning phase.

4. The slave equipment according to claim 3, wherein the processing circuitry estimates the frequency deviation of the master clock with use of a master frequency deviation table indicating relation between the master environment value and the frequency deviation.

5. The slave equipment according to claim 4, wherein the master frequency deviation table is acquired from the master equipment in the tuning phase.

6. A non-transitory computer readable medium storing a time synchronization program, for slave equipment to operate in accordance with a control frame transmitted from master equipment, to cause a computer to execute:
 a statistic calculation process of calculating a control frame statistic that is a statistic of one or more control frames transmitted from the master equipment;
 a master environment value estimation process of estimating a master environment value representing an operation environment of the master equipment, based on the calculated control frame statistic;
 a slave environment value measurement process of measuring a slave environment value representing an operation environment of the slave equipment;
 a frequency deviation estimation process of estimating a frequency deviation of a master clock included in the master equipment, based on the estimated master environment value and estimating a frequency deviation of a slave clock included in the slave equipment, based on the measured slave environment value; and
 a clock correction process of modifying a clock value of the slave clock based on a value corresponding to a lapse time from the last execution of modifying the clock value of the slave clock multiplied by a difference between the frequency deviation of the master clock and the frequency deviation of the slave clock, wherein
 the master environment value corresponds to a temperature of the master clock and the slave environment value corresponds to a temperature of the slave clock.

7. An embedded system comprising:
 master equipment to transmit one or more control frames; and
 slave equipment to operate in accordance with the one or more control frames transmitted from the master equipment, wherein
 the slave equipment includes
 a slave clock that is a clock device, and
 processing circuitry to:
 calculate a control frame statistic that is a statistic of the one or more control frames transmitted from the master equipment,
 estimate a master environment value representing an operation environment of the master equipment, based on the calculated control frame statistic,
 measure a slave environment value representing an operation environment of the slave equipment,
 estimate a frequency deviation of a master clock included in the master equipment, based on the estimated master environment value and to estimate a frequency deviation of the slave clock based on the measured slave environment value, and
 modify a clock value of the slave clock based on a value corresponding to a lapse time from the last execution of modifying the clock value of the slave clock multiplied by a difference between the frequency deviation of the master clock and the frequency deviation of the slave clock, wherein
 the master environment value corresponds to a temperature of the master clock and the slave environment value corresponds to a temperature of the slave clock.

\* \* \* \* \*